US008623461B2

(12) United States Patent
Fairbourn

(10) Patent No.: US 8,623,461 B2
(45) Date of Patent: Jan. 7, 2014

(54) METAL COMPONENTS WITH SILICON-CONTAINING PROTECTIVE COATINGS SUBSTANTIALLY FREE OF CHROMIUM AND METHODS OF FORMING SUCH PROTECTIVE COATINGS

(75) Inventor: David C. Fairbourn, Sandy, UT (US)

(73) Assignee: MT Coatings LLC, Cincinnati, OH (US)

( * ) Notice: Subject to any disclaimer, the term of this patent is extended or adjusted under 35 U.S.C. 154(b) by 1621 days.

(21) Appl. No.: 11/721,564

(22) PCT Filed: Dec. 12, 2005

(86) PCT No.: PCT/US2005/045078
§ 371 (c)(1),
(2), (4) Date: Apr. 8, 2008

(87) PCT Pub. No.: WO2006/065819
PCT Pub. Date: Jun. 22, 2006

(65) Prior Publication Data
US 2008/0274290 A1 Nov. 6, 2008

Related U.S. Application Data

(63) Continuation-in-part of application No. PCT/US2004/041896, filed on Dec. 13, 2004.

(51) Int. Cl.
*B05D 3/02* (2006.01)
(52) U.S. Cl.
USPC .................................................. 427/376.2
(58) Field of Classification Search
USPC .................................................. 427/376.2
See application file for complete search history.

(56) References Cited

U.S. PATENT DOCUMENTS

| | | | |
|---|---|---|---|
| 2,809,139 A | 10/1957 | Bloom et al. | |
| 3,047,419 A * | 7/1962 | Yntema et al. | 427/226 |
| 3,615,885 A | 10/1971 | Watson et al. | |
| 3,830,652 A * | 8/1974 | Gazza | 501/97.2 |
| 3,849,865 A | 11/1974 | Gedwill et al. | |
| 4,321,311 A | 3/1982 | Strangman | |
| 4,369,233 A * | 1/1983 | van Schaik | 428/678 |
| 4,427,720 A | 1/1984 | Gauje | |
| 4,500,364 A | 2/1985 | Krutenat | |

(Continued)

FOREIGN PATENT DOCUMENTS

DE 4103994 A1 8/1992
EP 0048083 A1 3/1982

(Continued)

OTHER PUBLICATIONS

USPTO, Office Action issued in related U.S. Appl. No. 11/721,532 dated May 24, 2010.

(Continued)

*Primary Examiner* — Nathan Empie
(74) *Attorney, Agent, or Firm* — Wood, Herron & Evans LLP

(57) ABSTRACT

A metal component (10) with a protective coating (16) containing silicon and a process for forming such protective coatings (14). The protective coating (16) is formed by applying a silicon-containing fluid composition to the metal component (10) as a silicon-containing layer (12) and heating the silicon-containing layer (12) to a temperature exceeding 400° F.

6 Claims, 1 Drawing Sheet

(56) References Cited

U.S. PATENT DOCUMENTS

| | | | |
|---|---|---|---|
| 4,774,149 A | 9/1988 | Fishman | |
| 4,835,011 A | 5/1989 | Olson et al. | |
| 4,880,614 A | 11/1989 | Strangman et al. | |
| 4,916,022 A | 4/1990 | Solfest et al. | |
| 5,015,502 A | 5/1991 | Strangman et al. | |
| 5,512,382 A | 4/1996 | Strangman | |
| 5,514,482 A | 5/1996 | Strangman | |
| 5,562,998 A | 10/1996 | Strangman | |
| 5,624,721 A | 4/1997 | Strangman | |
| 5,677,060 A * | 10/1997 | Terentieva et al. | 428/408 |
| 5,721,061 A | 2/1998 | Jackson et al. | |
| 5,780,110 A | 7/1998 | Schaeffer et al. | |
| 5,837,385 A | 11/1998 | Schaeffer et al. | |
| 5,900,283 A | 5/1999 | Vakil et al. | |
| 6,103,386 A | 8/2000 | Raybould et al. | |
| 6,224,963 B1 | 5/2001 | Strangman | |
| 6,287,644 B1 | 9/2001 | Jackson et al. | |
| 6,395,343 B1 | 5/2002 | Strangman | |
| 6,458,473 B1 | 10/2002 | Conner et al. | |
| 6,482,537 B1 | 11/2002 | Strangman et al. | |
| 6,579,627 B1 | 6/2003 | Darolia et al. | |
| 6,605,161 B2 | 8/2003 | Fairbourn | |
| 6,635,124 B1 | 10/2003 | Stowell et al. | |
| 6,673,709 B2 | 1/2004 | Jaslier et al. | |
| 6,689,422 B1 | 2/2004 | Warnes et al. | |
| 6,797,408 B2 | 9/2004 | Walston et al. | |
| 6,849,132 B2 | 2/2005 | Warnes et al. | |
| 6,884,470 B2 | 4/2005 | Gorman | |
| 6,924,038 B1 | 8/2005 | Hardy et al. | |
| 2002/0179191 A1 | 12/2002 | Fairbourn | |
| 2003/0185990 A1 | 10/2003 | Bittner et al. | |
| 2004/0038069 A1 | 2/2004 | Warnes et al. | |
| 2004/0067317 A1 | 4/2004 | Gorman | |
| 2005/0000425 A1 | 1/2005 | Fairbourn | |
| 2005/0170200 A1 | 8/2005 | Nagaraj et al. | |
| 2006/0057418 A1 | 3/2006 | Fairbourn | |

FOREIGN PATENT DOCUMENTS

| | | |
|---|---|---|
| EP | 0327311 A2 | 8/1989 |
| EP | 0532255 A1 | 3/1993 |
| EP | 0821078 A1 | 1/1998 |
| EP | 0897996 A1 | 2/1999 |
| EP | 0992612 A2 | 4/2000 |
| EP | 0992613 A2 | 4/2000 |
| EP | 1008672 A1 | 6/2000 |
| EP | 1010774 A1 | 6/2000 |
| EP | 1079073 A2 | 2/2001 |
| EP | 1111192 A1 | 6/2001 |
| EP | 1199377 A2 | 4/2002 |
| EP | 1229146 A2 | 8/2002 |
| EP | 1338668 A1 | 8/2003 |
| GB | 1439947 A | 6/1976 |
| GB | 1479498 A | 7/1977 |
| GB | 1529441 A | 10/1978 |
| GB | 2202235 A | 9/1988 |
| GB | 2252567 A | 8/1992 |
| GB | 2285632 A | 7/1995 |
| JP | 60100657 A | 4/1985 |
| WO | 9830735 A2 | 7/1998 |
| WO | 9924647 A1 | 5/1999 |
| WO | 0190438 A1 | 11/2001 |
| WO | 0190441 A2 | 11/2001 |
| WO | 02099153 A2 | 12/2002 |
| WO | 03035942 A2 | 5/2003 |
| WO | 2006036171 A | 4/2006 |

OTHER PUBLICATIONS

Daimer et al., "New Results on the Oxidation and Hot Corrosion of Silicide Overlay Coatings on Nickel-Based Alloys" Thin Solid Films 84, (1981) pp. 119-125.

European Patent Office, International Search Report issued in corresponding PCT Application serial No. PCT/US2004/041896 dated May 27, 2005.

European Patent Office, International Search Report issued in corresponding PCT Application serial No. PCT/US2005/045078 dated Oct. 10, 2006.

European Patent Office, International Search Report issued in corresponding PCT Application serial No. PCT/US2005/012527 dated Nov. 24, 2006.

European Patent Office, International Search Report issued in corresponding PCT Application serial No. PCT/US2005/044843 dated Jun. 14, 2007.

Savage, Jason L, U.S. Patent and Trademark Office, Office Action Dated Jan. 25, 2007 in related U.S. Appl. No. 10/943,116.

Savage, Jason L, U.S. Patent and Trademark Office, Office Action Dated Jun. 29, 2007 in related U.S. Appl. No. 10/943,116.

USPTO, Office Action issued in related U.S. Appl. No. 11/575,105 dated Nov. 2, 2009.

European Patent Office Official Letter in corresponding EP05858676.9, dated Jul. 24, 2009, 4 pgs.

European Patent Office Official Letter in corresponding EP05851165, dated Jul. 24, 2009, 4 pgs.

* cited by examiner

METAL COMPONENTS WITH SILICON-CONTAINING PROTECTIVE COATINGS SUBSTANTIALLY FREE OF CHROMIUM AND METHODS OF FORMING SUCH PROTECTIVE COATINGS

CROSS-REFERENCE TO RELATED APPLICATIONS

This application is a continuation-in-part of PCT/US2004/041896, filed on Dec. 13, 2004, the disclosure of which is hereby fully incorporated by reference herein in its entirety.

FIELD OF THE INVENTION

The present invention relates to coated metal components and, more particularly, substantially chromium-free metal components with a substantially chromium-free protective coating containing silicon, and methods of forming such substantially chromium-free protective coatings on substantially chromium-free metal components.

BACKGROUND OF THE INVENTION

Inorganic layers and coatings are often formed on a surface of a substantially chromium-free metal component to protect and mask the underlying metal substrate and to extend its useful life, such as by providing corrosion resistance and chemical resistance. Although zinc may be applied as an inorganic protective coating on iron or steel substrates either electrochemically by plating or by hot dip methods, such zinc protective coatings may be subject to corrosion in the form of a white rust defect. To prevent the occurrence of white rust defects, a conversion coating such as a chromate may be applied as a pretreatment on the iron or steel substrate before the zinc is applied. However, the process forming chromate coatings presents environmental and health risks that reduce their prevalence of use and that have instigated research to identify suitable substitute environmentally friendly coatings to replace chromate coatings.

Hard chrome plating is another common inorganic protective coating used in industrial equipment to reduce friction and wear. Hard chrome coatings are applied by electrolytic deposition processes. However, electrolytic deposition processes involve chemicals that are extremely hazardous, toxic, corrosive, and damaging to the environment. The use, storage, and disposal of the chemicals involved in electrolytic deposition processes are governed by law in most jurisdictions. Personal safety equipment and proper containment facilities are considered mandatory.

Copper is most frequently used as a pure, unalloyed metal. For example, copper tubing and pipes are used to transport potable water in a residence. However, copper corrodes over time and, if sulfur has been present, turns blue due to the formation of copper sulfate from sulfur exposure.

Organic (i.e., carbon-based) coatings, such as conventional paints, may also be used to protect substantially chromium-free metal substrates. However, organic coatings may deteriorate at high temperatures because of the presence of a polymer operating as a binder to confer film-forming properties. Consequently, organic coatings may lose their protective ability such that the formerly protected metal substrate is vulnerable to corrosion or chemical attack.

SUMMARY OF THE INVENTION

The present invention provides, in one aspect, methods for forming a substantially chromium-free protective coating on a substantially chromium-free metal component in which a substantially chromium-free fluid composition layer containing silicon is applied to the substantially chromium-free metal component and heated to a temperature exceeding 400° F. to convert the composition layer to the substantially chromium-free protective coating. The fluid composition layer may be a liquid composition layer. The protective coating may be, for example, effective for reducing corrosion and sulfidation of the underlying metal of the metal component. The metal component may be formed from any metal including, but not limited to, iron, aluminum, titanium, copper, nickel, and alloys of each of these metals such as mild steel and stainless steels.

The properties of the protective coating may be tailored according to the type of atmosphere in which the substantially chromium-free, silicon-containing fluid composition layer is heated. The fluid composition layer may be heated in air to form, for example, a silica or silicate protective coating or film. Alternatively, the fluid composition layer may be heated in argon to form, for example, a metal silicide protective coating.

The substantially chromium-free, silicon-containing protective coating of the present invention would operate to mask and protect the underlying base metal of the metal component at room temperature and may retain the protective properties at elevated temperatures that area significantly above room temperature. The heat resistance would be advantageous in comparison to, for example, conventional organic or carbon-based paints that deteriorate at high temperatures and, therefore, lose their protective ability.

The protective coating of the present invention would also eliminate the risks and concerns associated with producing conventional chromate coatings and hard chromium plating, among other types of conventional coatings. The protective coating of the present invention may also be applied to metal components that otherwise would not receive such coatings, such as copper tubing. The protective coating of the present invention may also reduce the need to alloy the metal of a component with another metal to impart corrosion resistance.

By virtue of the foregoing, there is provided methods for forming a substantially chromium-free protective coating on a substantially chromium-free metal component that applies a substantially chromium-free fluid composition layer containing silicon is applied to the metal component and heats the composition layer to a temperature exceeding 400° F. that is sufficient to convert the composition layer to the substantially chromium-free protective coating. These and other benefits and advantages of the present invention shall be made apparent from the accompanying drawings and description thereof.

BRIEF DESCRIPTION OF THE DRAWINGS

The accompanying drawings, which are incorporated in and constitute a part of this specification, illustrate an embodiment of the invention and, together with a general description of the invention given above, and the detailed description of the embodiment given below, serve to explain the principles of the invention.

DETAILED DESCRIPTION OF PREFERRED EMBODIMENTS

Figure 1:
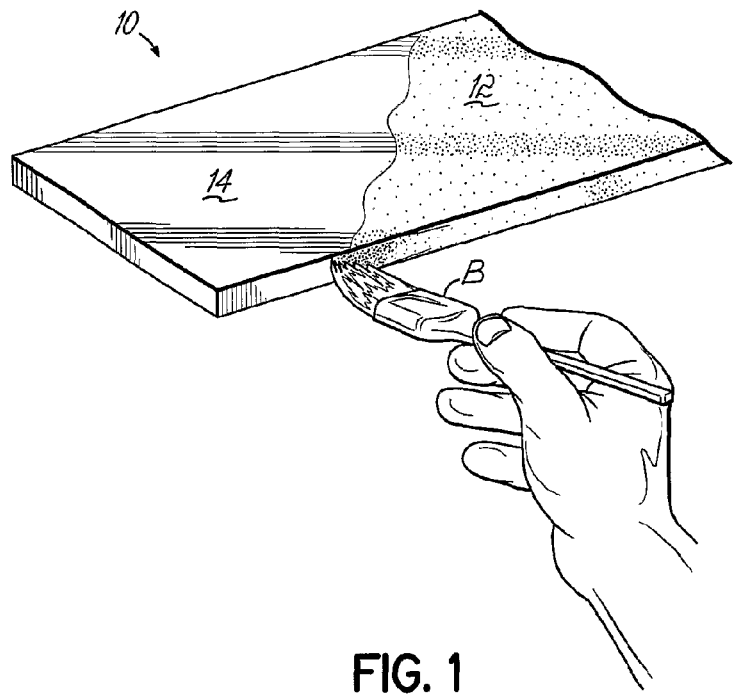
FIG. 1 is a perspective view of a metal component with a fluid composition being applied to at least a portion of the metal component in accordance with the principles of the present invention.
Figure 2:
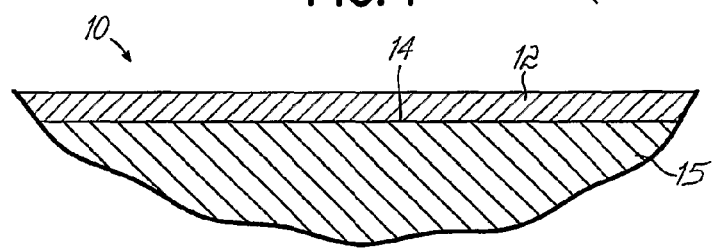
FIG. 2 is a diagrammatic cross-sectional view of a portion of the metal component of FIG. 1 that includes a silicon-containing layer formed by the application of the fluid composition.

With reference to FIGS. 1 and 2 and in accordance with an embodiment of the present invention, a substantially chromium-free, silicon-containing layer 12 is applied to at least a portion of an original surface 14 of a substantially chromium-free metal component 10. The metal component 10 may be formed from a substantially chromium-free substrate 15 that includes any metal including, but not limited to, iron, aluminum, titanium, copper, nickel, and alloys of each of these materials, including mild steel and stainless steels. The metal may also include some non-metallic components. However, layer 12 and substrate 15 are substantially free of chromium content, other than a trace amount of chromium present as an impurity.

The substantially chromium-free, silicon-containing layer 12 may be formed from a substantially chromium-free, silicon-containing fluid composition (e.g., liquid composition, solution, or slurry) that is applied to surface 14, such as by hand application with a paint brush B (FIG. 1) as if being painted, by spraying in a controlled manner, or by dipping into a bath (not shown). The uncured fluid composition is then cured at a low temperature to form a solid or semi-solid that is bonded to the surface 14. In one embodiment of the present invention, the silicon-containing layer 12 may be cured by air-drying with optional heating. The curing temperature of the silicon-containing layer 12 is significantly less than 400° F. For example, the fluid composition may be cured at about 250° F. (121° C.) for about 15 to 25 minutes to form the silicon-containing layer 12. The fluid composition forming layer 12 is substantially free of chromium content, other than a trace amount of chromium present as an impurity.

Before the substantially chromium-free, silicon-containing layer 12 is applied, the surface 14 may be substantially cleaned of any contaminants. For example, a degreaser, such as acetone, sodium hydroxide (NaOH) or potassium hydroxide (KOH) may be used to clean the surface 14 and potentially improve the bonding of the cured layer 12 to the surface. A biocide, such as silver chloride (AgCl) may also be added to the fluid composition before layer 12 is applied to surface 14.

A particular fluid or liquid composition that may be selected for use in forming layer 12 is a silicon-containing substance or liquid such as a silane. Silanes suitable for use in the present invention may have mono-, bis-, or tri-functional trialkoxy silane. The silane may be a bifunctional trialkoxy silyl, preferably trimethoxy, or triethoxy silyl groups. Amino silanes may also be used, although thio silanes may not be desired due to their sulfur content. Bisfunctional silane compounds are well known to persons having ordinary skill in the art, and two preferred for use in the present invention are bis(triethoxysilyl)ethane and bis(trimethoxysilyl)methane. In both of these compounds, the bridging group between the two silane moieties is an alkyl group. Additional commercially available silanes include, but are not limited to, 1,2-Bis(tetramethyldisoloxanyl) Ethane
1,9-Bis(triethoxysilyl)Nonane
Bis(triethoxysilyl)Octane
Bis(trimethoxysilyl Ethane
1,3-Bis(trimethylsiloxy)-1,3-Dimethyl Disiloxane
Bis(trimethylsiloxy)Ethylsilane
Bis(trimethylsiloxy) Methylsilane
Al-501 available from AG Chemetall (Frankfurt Germany)

The silane may be neat, in an aqueous solution, or diluted in an aqueous/alcohol solvent solution. A solvent for the latter type of diluted solution may contain from about 1% to 2% by volume to about 30% by volume deionized water with the remainder being a monohydric alcohol such as methanol, ethanol, n- or iso-propanol, or the like. Ethanol and methanol are preferred monohydric alcohols. The solvent is combined with the silane and glacial acetic acid to preferably establish a pH of about 4-6. The silane concentration in the solution may be limited to a maximum concentration for which the silane remains in solution during application. Generally, the solution will consist of about 1% to about 20% silane, wherein the percentage may be measured either by volume or by weight.

A particularly useful silane for use in providing silicon-containing layer 12 may be an organofunctional silane such as BTSE 1,2 bis(triethoxysilyl)ethane or BTSM 1,2 bis(trimethoxysilyl)methane. The silane may be dissolved in a mixture of water and acetic acid at a pH of 5, then in denatured alcohol and glacial acetic acid to establish a silane solution. The silane concentration in the solution is between about 1% and 10% by volume and, advantageously, about 5% by volume. This silane solution readily forms the silicon-containing layer 12, which may have a more or less hard consistency, at a temperature readily achieved and insufficient to form the protective coating 16.

Generally, the liquid composition that is applied to, after curing, form the silicon-containing layer 12 is applied in an amount of about 0.01 g/cm$^2$ to about 2.0 g/cm$^2$. Multiple layers of the liquid composition may be applied; each individual layer being dried and heated to remove the solvent before applying the next successive layer. As used herein, the silicon-containing layer 12 may refer to either the initially applied layer of liquid composition, or without limitation to the dried layer. The silicon-containing layer 12 may have a thickness in the range of about 40 nm to about 200 nm in the cured state and may form a continuous layer on surface 14, although the invention is not so limited.

Silicon-containing layer 12 is heated to a temperature and for a duration effective to convert layer 12 into a substantially chromium-free, silicon-containing protective coating 16 across the portion of the original surface 14 of the metal component 10 to which layer 12 is applied. Generally, the conversion temperature is a temperature between 400° F. and about 70 percent of the melting temperature of the substantially chromium-free metal constituting component 10. The specific temperature to which silicon-containing layer 12 is heated to cause the conversion to protective coating 16 will depend, among other things, upon the composition and characteristics of the liquid composition used to form layer 12 and the specific metal constituting the metal component 10. The protective coating 16 may be continuous with a thickness measured relative to an exposed surface 24 that, after the coating 16 is applied, is exposed to the operating environment of the metal component 10. The protective coating 16 substantially free of chromium content, other than a trace amount of chromium present as an impurity.

A particularly advantageous conversion temperature may be the eutectic temperature for silicon and the particular metal constituting the metal component 10. A eutectic or eutectic mixture is a mixture of two or more elements that has a lower melting point than any of its constituents. The proper ratio of silicon and metal to obtain a eutectic alloy is identified by the eutectic point on a phase diagram. The eutectic point is the point at which the liquid phase borders directly on the solid forms of pure silicon and the pure metal, which represents the minimum melting temperature or eutectic temperature of any possible alloy of silicon and the metal(s) constituting the metal component 10.

The substantially chromium-free silicon-containing layer 12 may be heated in various different atmospheres and under various different conditions to form the substantially chromium-free protective coating 16. The conversion from substantially chromium-free, silicon-containing layer 12 to substantially chromium-free, silicon-containing protective coating 16 may be accomplished by placing the metal component 10 into a heated enclosure, like an oven or furnace. However, the specific heating method may be selected based upon the size of the component 10 and the availability of heating options. The heated enclosure is heated to a temperature sufficient to elevate layer 12 to a temperature sufficient to cause the conversion. The curing step to form silicon-containing layer 12 and the subsequent step converting the cured layer 12 into protective coating 16 may be conducted in the same heated enclosure or before placing the metal component 10 into the heated enclosure. The silicon-containing layer 12 cures at a lower temperature than the temperature required to convert layer 12 into protective coating 16.

For example, the heat tunnels used in powder coaters (not shown) may provide a suitable heated environment or enclosure. In particular, this approach may be particularly advantageous for forming the protective coating 16 on metal components composed of aluminum.

The substantially chromium-free, silicon-containing layer 12 communicates with the ambient atmosphere surrounding the substantially chromium-free metal component 10 during heating. The properties of the protective coating 16 may be tailored according to the type of atmosphere in which the fluid composition in the silicon-containing layer 12 is heated. The substantially chromium-free silicon-containing layer 12 may be heated in an oxidizing ambient atmosphere, such as air, to convert layer 12 to a substantially chromium-free protective coating 16 containing oxygen and silicon, such as a glass precursor of silicon like $SiO_2$, a silica, or a silicate. The oxygen-containing coating 16 may optionally include elements from the material constituting the metal component 10 such that the protective coating 16 comprise a mixtures of metal oxides formed from the metal matrix that is covered by a thin silicon-enriched oxide outer layer.

Alternatively, the substantially chromium-free silicon-containing layer 12 may be heated in a non-oxidizing ambient atmosphere, such as argon, to form, for example, a substantially chromium-free protective coating 16, such as a metal silicide, that contains silicon from layer 12 and a concentration of one or more elements from the constituent material of the metal component 10. The non-oxidizing ambient environment may be an oxygen-depleted environment created by evacuating atmospheric gases (air) from a heating chamber and filling the evacuated chamber with an inert gas.

In an alternative embodiment of the present invention, the substantially chromium-free silicon-containing layer 12 may further include an additive that is subsequently incorporated as an optional dopant into the substantially chromium-free protective coating 16. Suitable additives generally include any compound of the dopant that is dissolvable in the particular silane solution, although additives containing sulfur ligands and/or oxygen ligands may be disfavored. If the dopant is yttrium, for example, suitable yttrium compounds include, but are not limited to, yttrium halides, such as yttrium chloride, yttrium bromide, yttrium iodide, and yttrium fluoride. Other suitable yttrium compounds include, but are not limited to, yttrium acetate, yttrium acetate hydrate, yttrium 2-ethylhexanoate, yttrium perchlorate solution (e.g., 40 wt. % in water), yttrium nitrate hexahydrate, yttrium nitrate tetrahydrate, yttrium isopropoxide oxide, yttrium isopropoxide solution (e.g., 25 wt. % in toluene), yttrium butoxide solution (e.g., 0.5 M in toluene), yttrium trifluoroacetate hydrate, yttrium oxalate hydrate, and yttrium(III) tris(2,2,6,6-tetramethyl-3,5-heptanedionate). If the dopant is hafnium, for example, suitable hafnium compounds include, but are not limited to, hafnium halides, such as hafnium chloride, hafnium bromide, hafiium iodide, and hafnium fluoride. Other suitable hafnium compounds include, but are not limited to, any haffiium compound with an organic ligand, such as hafnium tert-butoxide, and hafnium nitrates. Permitted hafnium compounds generally exclude compounds with either sulfur ligands or oxide ligands. These, and other, yttrium and hafnium compounds are commercially available, for example, from Sigma-Aldrich (St. Louis, Mo.).

In this alternative embodiment of the present invention, one or more of the candidate dopant compounds is dissolved in or combined with the silane or silane solution. Before combining, the added amount of the dopant compound is measured for accurately regulating the concentration of dopant in the substantially chromium-free silicon-containing layer 12 and, subsequently, in the protective coating 16. Typically, a single additive or dopant compound will be combined with the silane to form the fluid composition that is applied as layer 12 to all or a portion of surface 14.

Figure 2A:
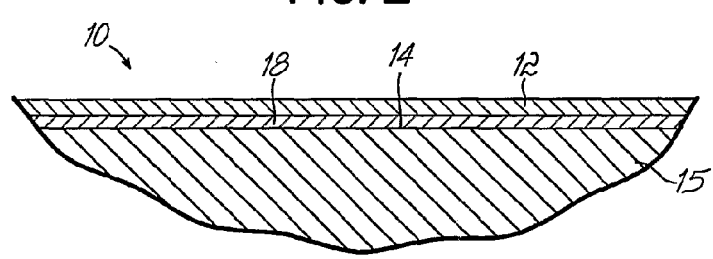
FIG. 2A is a diagrammatic cross-sectional view similar to FIG. 2 in which the silicon-containing layer is applied on an existing layer on the metal component.

With reference to FIG. 2A, the substantially chromium-free silicon-containing layer 12 may be applied across an existing coating 18 on substrate 15. The existing coating 18 may be, for example, an existing protective coating 16 that is in need of repair. The existing coating 18 may be stripped from surface 14 before the silicon-containing layer 12 is applied for forming the protective coating 16.

Figure 3:
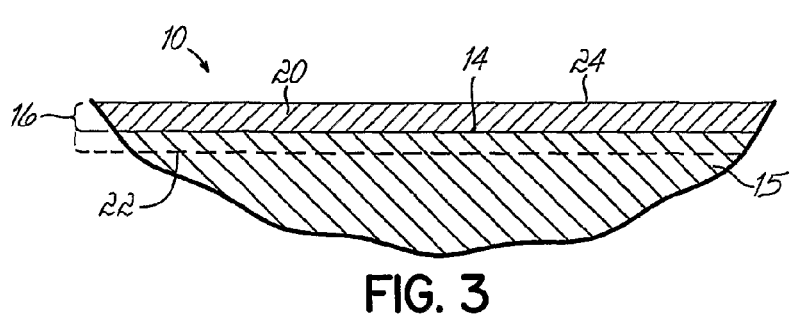
FIG. 3 is a diagrammatic cross-sectional view similar to FIG. 2 after the silicon-containing layer is converted to a protective coating.

With reference to FIG. 3, a detailed view of a portion of the substantially chromium-free metal component 10 and the substantially chromium-free protective coating 16 is shown. The metal component 10 includes the protective coating 16 on the surface 14 of the substrate 15. The protective coating 16 protects the underlying metal of the substrate 12 of metal component 10 against, for example, oxidation and corrosion.

The substantially chromium-free protective coating 16 may be an additive layer 20 or, more typically, may include a concentration of one or more elements from substrate 15 because of interdiffusion between the applied silicon-containing layer 12 and the metal of the substrate 15. In such diffusion coatings, the protective coating 16 will be generally characterized by a diffusion zone 22 in addition to the additive layer 20 that overlies the diffusion zone 22. The interdiffusion may advantageously introduce a concentration of one or more additional elements from the substrate 15 into the protective coating 16 that ultimately endow the coating 16 with beneficial protective capabilities. However, the diffusion zone 22 may be absent. The invention also contemplates that the silicon from the layer 12 may diffuse into the surface 14 and combine with the metal of the substrate 15 such that the original surface 14 is present after the conversion and the silicon resides entirely in a diffusion zone 22.

The invention further contemplates that the fluid compositions described herein may be introduced into internal passages (not shown) of the substantially chromium-free metal component 10 for purposes of forming the substantially chromium-free, silicon-containing protective coating 16 on internal surfaces bordering the passages. To that end, the silicon-containing fluid composition is introduced into the passages to form substantially chromium-free, silicon-containing layer 12 and heated to form the protective coating 16 on these internal surfaces.

As an example, the substantially chromium-free, silicon-containing layer 12 may be applied to a metal component 10 composed of zinc and heated in an oxidizing environment, like air, to a temperature greater than 400° F. that is sufficient to form a protective coating 16, which may be zinc oxide, that incorporates silicon from the liquid composition constituting layer 12. Although not wishing to be limited by theory, the protective coating is believed to reduce oxidation of the underlying zinc substrate 15.

As another example, the substantially chromium-free, silicon-containing layer 12 may be applied to a metal component 10 composed of copper by immersion in the liquid composition, preferably almost immediately after the copper component 10 is drawn to a final dimension. When heated to a temperature of, for example, less than 400° C. (752° F.) but greater than 400° F. in a non-oxidizing environment like air, a protective coating 16 containing silicon is formed in which silicon is incorporated into copper metal as a diffusion zone 22 with an optional additive layer 20. The protective coating 16 may be a copper silicide layer.

As yet another example, the substantially chromium-free, silicon-containing layer 12 may be applied to a metal component 10 composed of a steel. The application of a thin layer of silane followed by heating to a temperature less than 770° C. (1418° F.) but greater than 400° F. in a non-oxidizing environment forms a protective coating 16, which may be ferric silicide, that improves corrosion resistance. The solubility of the silicon in iron is less than four (4) weight percentage. In very dilute solutions less than 0.4 weight percent silicon, silicon may replace carbon in the steel.

In another aspect of the present invention, the existing layer 18 (FIG. 2A) may be a hard chromium coating or plating that is pre-existing on the substantially chromium-free metal component 10 before the substantially chromium-free, silicon-containing layer 12 is applied. The silicon-containing layer 12 is heated to a temperature less than 800° C. (1472° F.) but greater than 400° F. in an inert environment to form the protective coating 16. Although the resultant protective coating 16 is not substantially free of chromium as preferred by the present invention, the chromium in coating 16 does not originate from either component 10 or layer 12 but, instead, originates from layer 18.

As yet another example, the substantially chromium-free, silicon-containing layer 12 may be applied to a metal component 10 composed of aluminum, followed by heating to less than 400° C. (752° F.) but greater than 400° F. in a non-oxidizing environment, which is believed to produce a protective coating 16 of aluminum silicide. The solubility of silicon in aluminum is limited to a maximum of one (1) weight percent to 1.5 weight percent at the eutectic temperature of 577° C. (1071° F.).

The protective coating 16 may also increase the resistivity of the metal of the metal component 10, which may represent an additional benefit of the present invention.

While the present invention has been illustrated by the description of an embodiment thereof and specific examples, and while the embodiment has been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of applicant's general inventive concept.

Having described the invention, what is claimed is:

1. A coating process for protecting a surface (14) of a substantially chromium-free metal component (10), the coating process comprising:
   combining a substantially chromium-free silicon-containing fluid composition comprising a silane liquid with a dopant that is dissolvable in the silane liquid and is selected from the group consisting of yttrium, hafnium, and combinations thereof;
   applying a layer (12) of the substantially chromium-free, silicon-containing fluid composition to at least a portion of the surface (14);
   curing the substantially chromium-fee, silicon-containing fluid composition after the layer (12) is applied to the surface (14);
   placing the cured substantially chromium-free, silicon-containing fluid composition in layer (12) in a non-oxidizing atmosphere before heating; and
   heating the cured substantially chromium-free, silicon-containing fluid composition in layer (12) to a temperature of about 70 percent of the melting temperature of the substantially chromium-free component (10) or to the eutectic temperature of silicon and the metal constituting the substantially chromium-free metal component to form a substantially chromium-free, silicon-containing protective coating (16) on the surface (14) that includes silicon from the cured silicon-containing fluid composition and metal from the metal component (10).

2. The coating process of claim 1 wherein the substantially chromium-free metal component (10) is composed of iron, aluminum, titanium, copper, nickel, or an alloy of these materials.

3. The coating process of claim 1 wherein silicon from the cured silicon-containing fluid composition diffuses into the surface (14) to combine with the metal from the metal component (10) such that the original surface (14) is present after heating and silicon resides entirely in a diffusion zone (22).

4. A coating process for protecting a surface (14) of a substantially chromium-free metal component (10), the coating process comprising:
   combining a substantially chromium-free, silicon-containing fluid composition comprising a silane liquid with a dopant that is dissolvable in the silane liquid and is selected from the group consisting of yttrium, hafnium, and combinations thereof;
   applying a layer (12) of the substantially chromium-free, silicon-containing fluid composition to at least a portion of the surface (14);
   curing the substantially chromium-free, silicon-containing fluid composition after the layer (12) is applied to the surface (14);
   placing the substantially chromium-free, silicon-containing fluid composition in layer (12) in a non-oxidizing atmosphere before heating; and
   heating the cured substantially chromium-free, silicon-containing fluid composition in layer (12) to a temperature greater than 400° F. to form a substantially chromium-free, silicon-containing protective coating (16) on the surface (14) that includes silicon from the cured silicon-containing fluid composition and metal from the metal component (10).

5. The coating process of claim 4 wherein the substantially chromium-free metal component (10) is composed of iron, aluminum, titanium, copper, nickel, or an alloy of these materials.

6. A coating process for protecting a metal component (10) having a surface (14) at least partially covered with hard chromium plating (16), comprising:
- applying a layer (12) of a substantially chromium-free, silicon-containing fluid composition comprising a silane liquid and a dopant that is dissolvable in the silane liquid and is selected from group consisting of yttrium, hafnium, and combination thereof to at least a portion of the hard chromium plating (16);
- curing the substantially chromium-free, silicon-containing fluid composition after the layer (12) is applied to the hard chromium plating (16); and
- heating the cured substantially chromium-free, silicon-containing fluid composition to a temperature greater than 400° F. to form a protective coating (16) on the metal component (10) that includes silicon from the cured silicon-containing fluid composition and at least one of oxygen from an ambient atmosphere communicating with the layer (12) or chromium from the hard chromium plating (16).

* * * * *

UNITED STATES PATENT AND TRADEMARK OFFICE
CERTIFICATE OF CORRECTION

PATENT NO. : 8,623,461 B2  Page 1 of 1
APPLICATION NO. : 11/721564
DATED : January 7, 2014
INVENTOR(S) : David C. Fairbourn It is certified that error appears in the above-identified patent and that said Letters Patent is hereby corrected as shown below:

In the Specification:

At column 6, line number 14, change "haffiium" to --hafnium--

In the Claims:

At column 8, claim number 1, line number 9, after "free" insert --,--

Signed and Sealed this
Twentieth Day of May, 2014

Michelle K. Lee
*Deputy Director of the United States Patent and Trademark Office*